April 28, 1964 M. D. MYERS ET AL 3,130,840
CONTAINER SHIP CRANES

Filed Oct. 12, 1961 9 Sheets-Sheet 1

INVENTORS.
Mark D. Myers
George A. Noble
John W. Simmons
William C. Bennett
BY
their ATTORNEYS April 28, 1964 M. D. MYERS ET AL 3,130,840
CONTAINER SHIP CRANES Filed Oct. 12, 1961 9 Sheets-Sheet 3

INVENTORS.
Mark D. Myers
George A. Noble
John W. Simmons
William C. Bennett
BY
Hoopes Leonard Buell
their ATTORNEYS INVENTORS.
Mark D. Myers
George A. Noble
John W. Simmons
William C. Bennett
BY
their ATTORNEYS April 28, 1964 M. D. MYERS ET AL 3,130,840
CONTAINER SHIP CRANES Filed Oct. 12, 1961 9 Sheets-Sheet 5

INVENTORS.
Mark D. Myers
George A. Noble
John W. Simmons
William C. Bennett
BY
their ATTORNEYS April 28, 1964     M. D. MYERS ET AL     3,130,840
CONTAINER SHIP CRANES Filed Oct. 12, 1961     9 Sheets-Sheet 6

INVENTORS.
Mark D. Myers
George A. Noble
John W. Simmons
BY William C. Bennett
*their* ATTORNEYS April 28, 1964    M. D. MYERS ET AL    3,130,840
CONTAINER SHIP CRANES Filed Oct. 12, 1961    9 Sheets-Sheet 8

INVENTORS
Mark D. Myers
George A. Noble
John W. Simmons
William C. Bennett
BY
their ATTORNEYS April 28, 1964  M. D. MYERS ET AL  3,130,840
CONTAINER SHIP CRANES Filed Oct. 12, 1961  9 Sheets-Sheet 9

INVENTORS
Mark D. Myers
George A. Noble
John W. Simmons
BY  William C. Bennett
their ATTORNEYS

United States Patent Office 3,130,840
Patented Apr. 28, 1964

3,130,840
CONTAINER SHIP CRANES
Mark D. Myers, Sebring, and George A. Noble, John W. Simmons, and William C. Bennett, Alliance, Ohio, assignors to The Alliance Machine Company, Alliance, Ohio
Filed Oct. 12, 1961, Ser. No. 144,719
10 Claims. (Cl. 214—15)

This invention relates to container ship cranes and particularly to container ship cranes having an extensible girder adapted to extend over either side of the ship so as to carry a lifting trolley over a loading and unloading dock.

Container ship cranes have heretofore been proposed for the purpose of loading and unloading containers from ships. They have existed in several forms. One form consists of a gantry having rotatable arms capable of rotating about the end of the gantry so as to form an overhanging portion. Such devices have limited utility and are subject to many problems and limitations. The present invention provides a container ship crane capable of extending over either side of the ship at any position lengthwise of the ship and at a controlled reach over the side of the ship. None of the devices heretofore available have provided such a structure.

Preferably, there is provided a main frame extending across the width of the ship, leg means supporting the ship at each end, trackways parallel to the center line of the ship adjacent each side of the ship upon which the legs are adapted to move, drive means for moving the leg means on said trackway, an extensible frame movably mounted on the main frame for movement parallel and to a position in which the extensible frame extends over the ship on one side to a position where the opposite end extends over the opposite side of the ship, a load trolley movable on said extensible girder from one end to the other, a machinery trolley movable on the extensible girder in a direction opposite that of the load trolley, whereby the machinery trolley counterbalances the load trolley and drive means moving the extensible girder, the load trolley and the machinery trolley in cooperative relationship. Preferably, the leg means carrying the main frame are in the form of C-shaped members. One leg of each C member carrying rollers operable on trackways on the ship deck, the other leg of each C member carrying the main frame above and spaced from the said one leg.

In the foregoing general description, certain purposes, objects and advantages of this invention have been set out. Other objects, purposes and advantages will become apparent from the following description of the accompanying drawings in which, FIGURE 1 is a side elevation of a ship showing the arrangement of cranes according to this invention;

Figure 1:
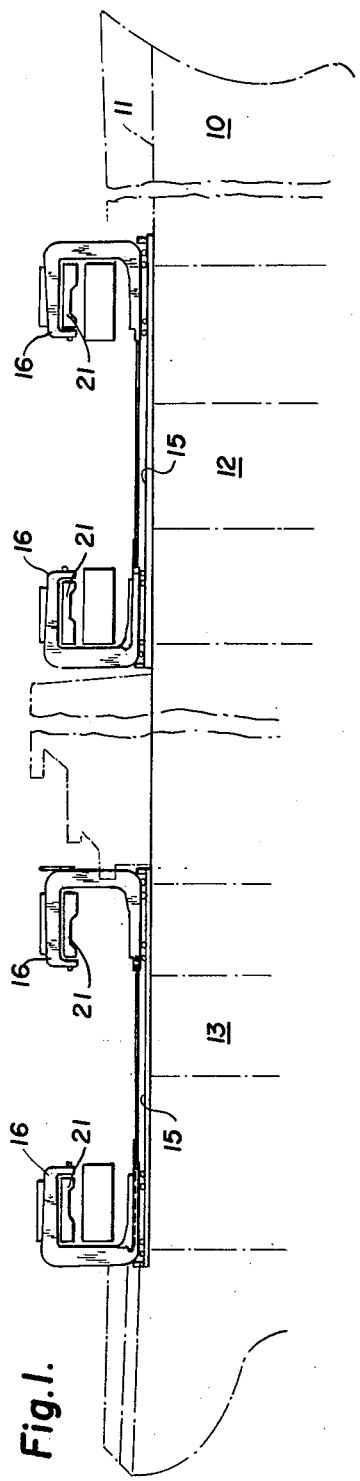
Figure 2:
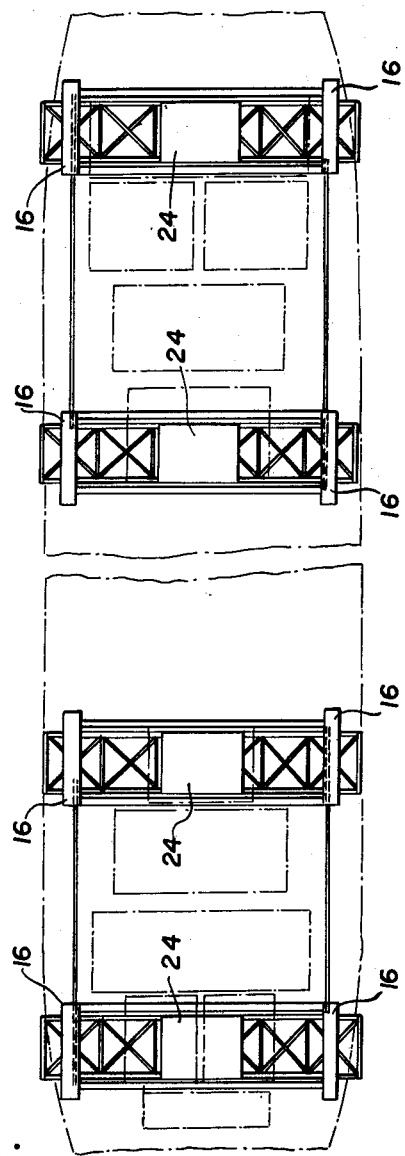
FIGURE 2 is a plan view of the deck of FIGURE 1 showing the arrangement of cranes according to this invention.
Figure 4:
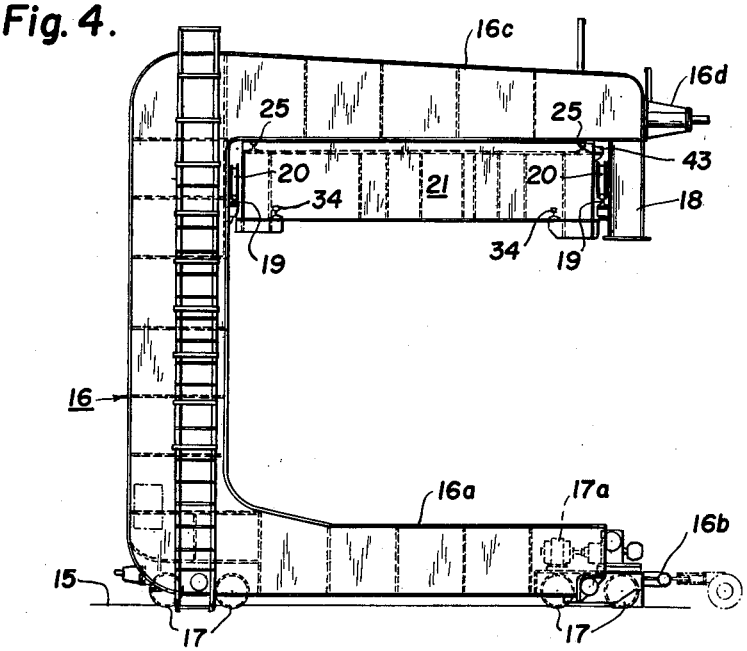
FIGURE 4 is an enlarged end elevation of a crane according to this invention.
Figure 3:
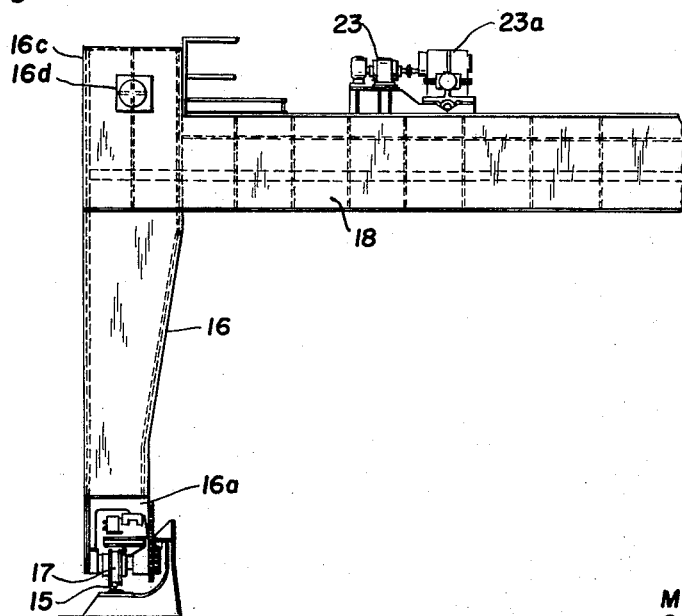
FIGURE 3 is an enlarged side elevation of a crane according to this invention.
Figure 5:
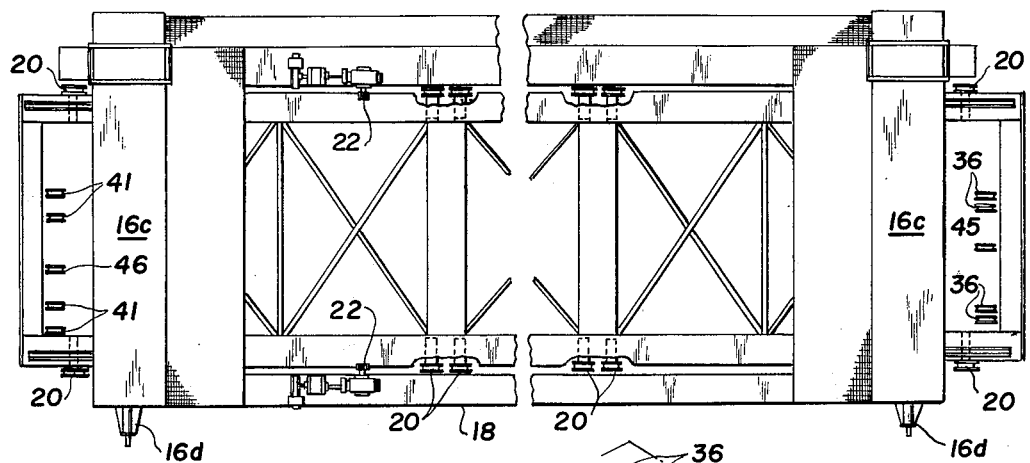
FIGURE 5 is an enlarged top plan view of a crane according to the invention.
Figure 6:
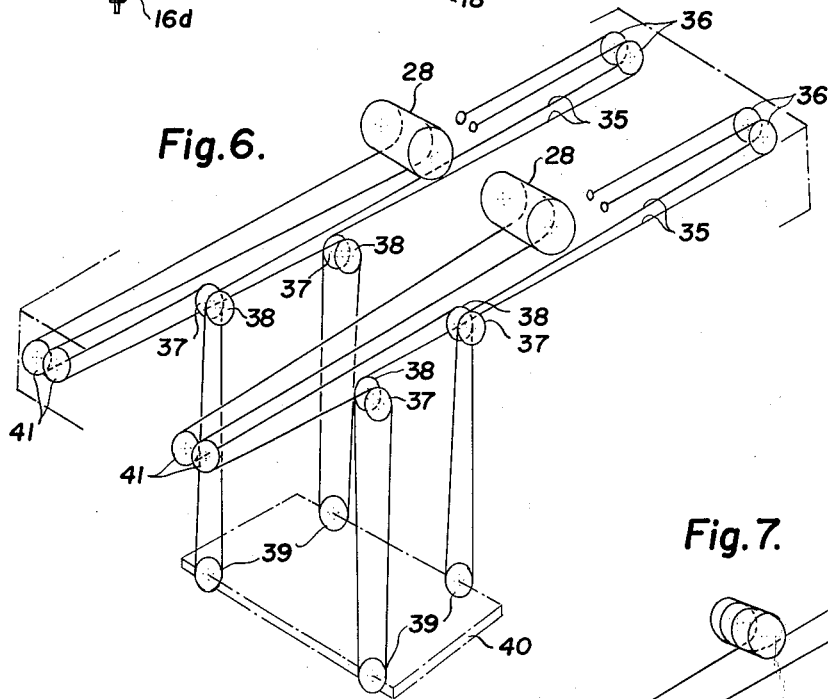
FIGURE 6 is a diagrammatic view of the hoist rope reeving.
Figure 7:
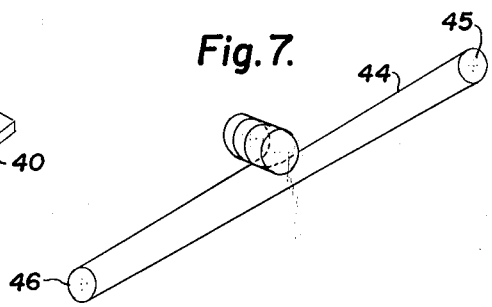
FIGURE 7 is a diagrammatic view of the travel rope reeving.
Figure 8:
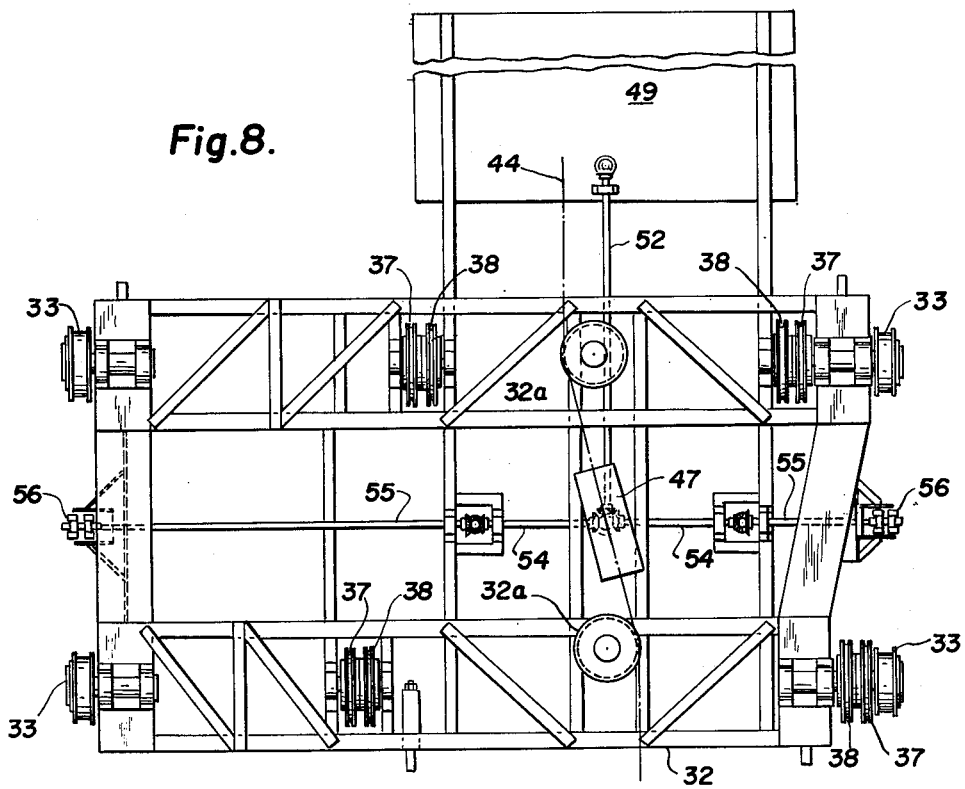
FIGURE 8 is an enlarged plan view of the hoist trolley.
Figure 9:
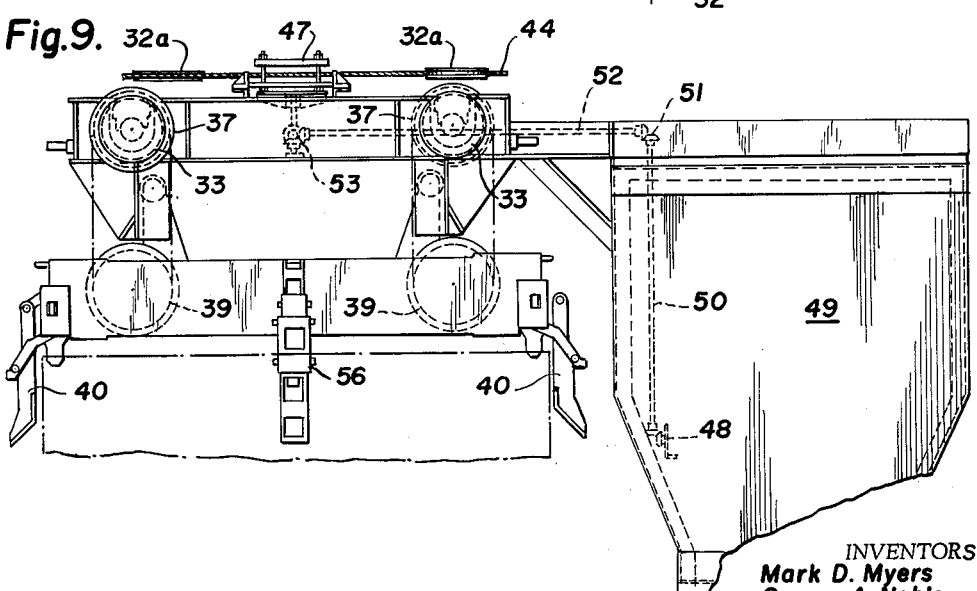
FIGURE 9 is an enlarged side elevation of the load trolley.
Figure 10:
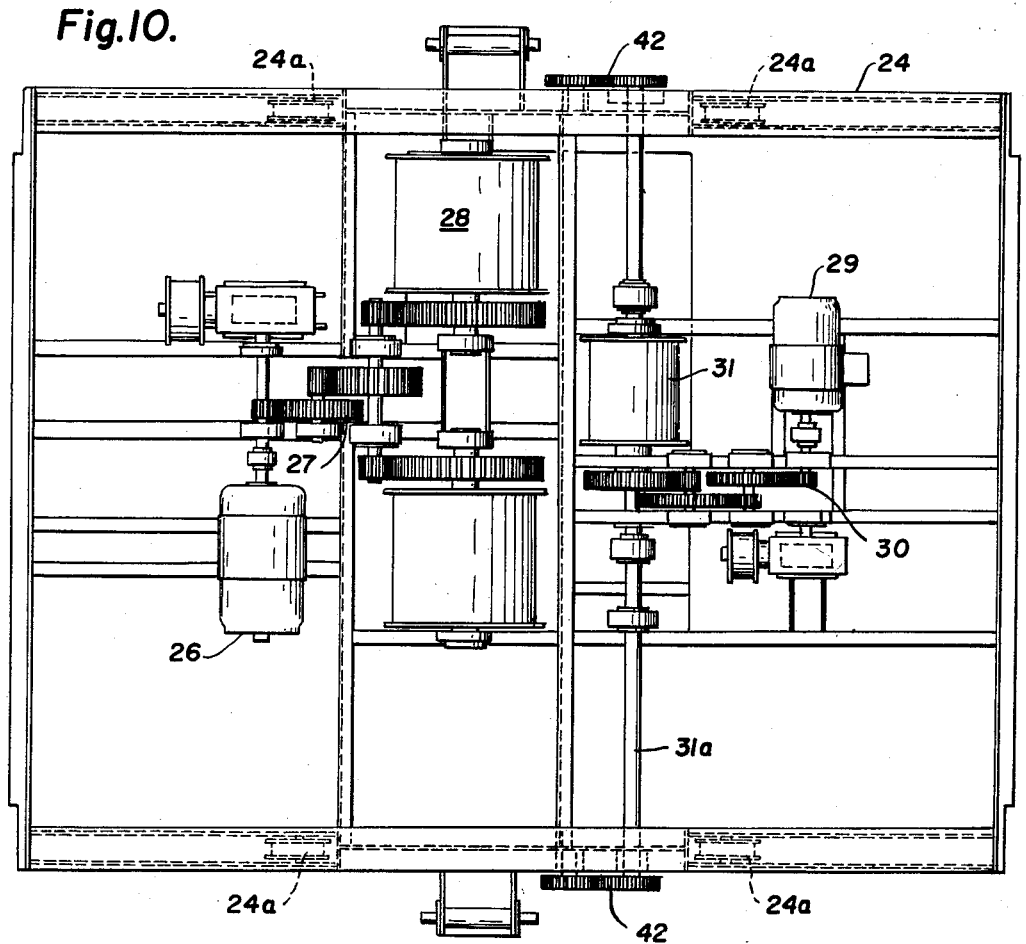
FIGURE 10 is an enlarged plan view of the machinery trolley.
Figure 11:
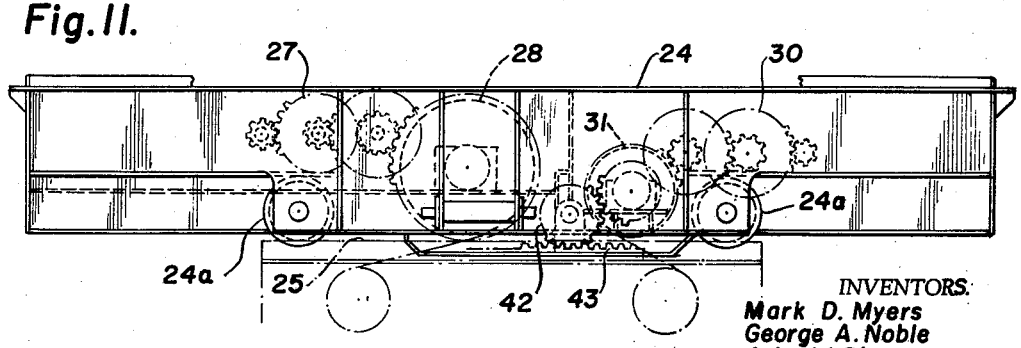
FIGURE 11 is an enlarged side elevation of the machinery trolley.
Figure 12:
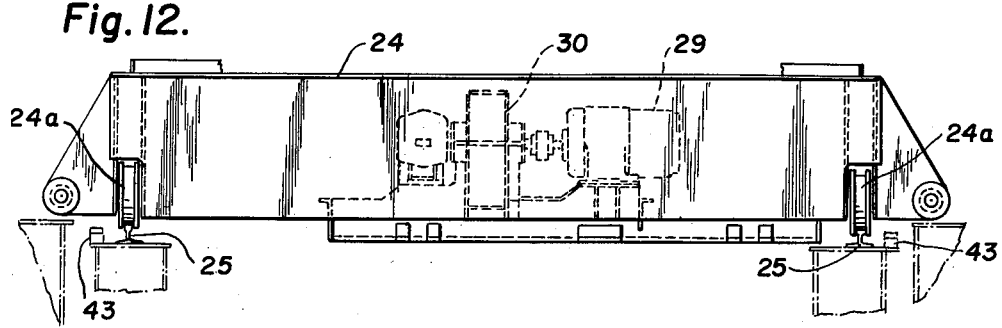
FIGURE 12 is an enlarged end elevation of the machinery trolley.
Figure 13:
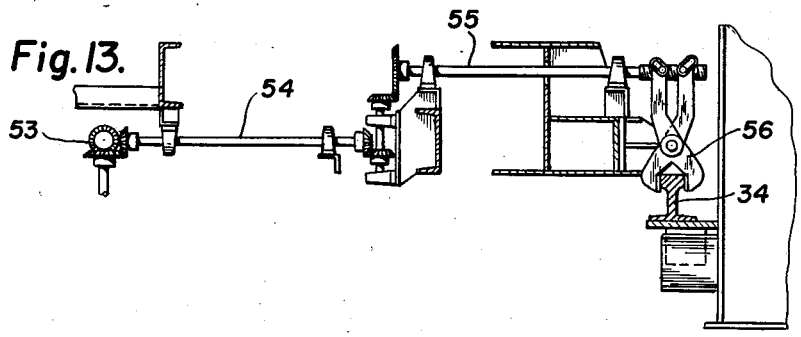
FIGURE 13 is a section on the line XIII—XIII of FIGURE 8.
Figure 14:
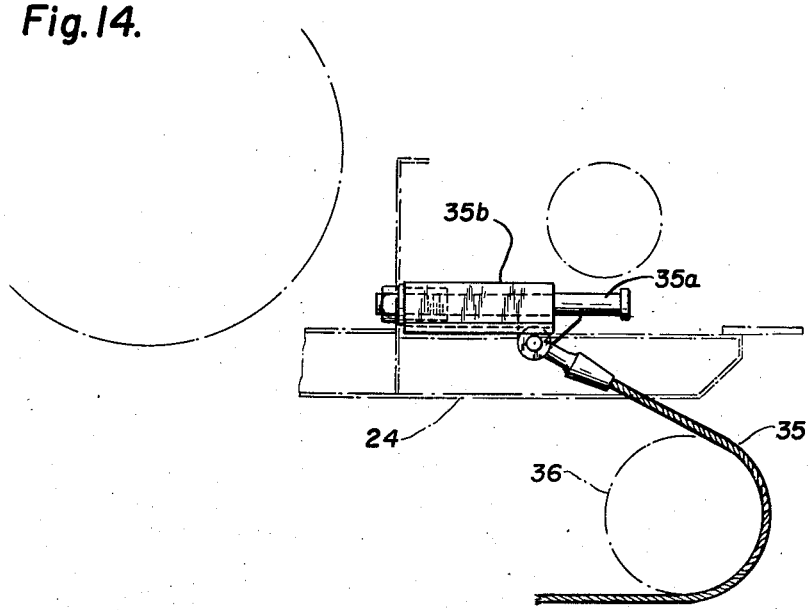
FIGURE 14 is an enlarged side elevation of the dead end arrangement.
Figure 15:
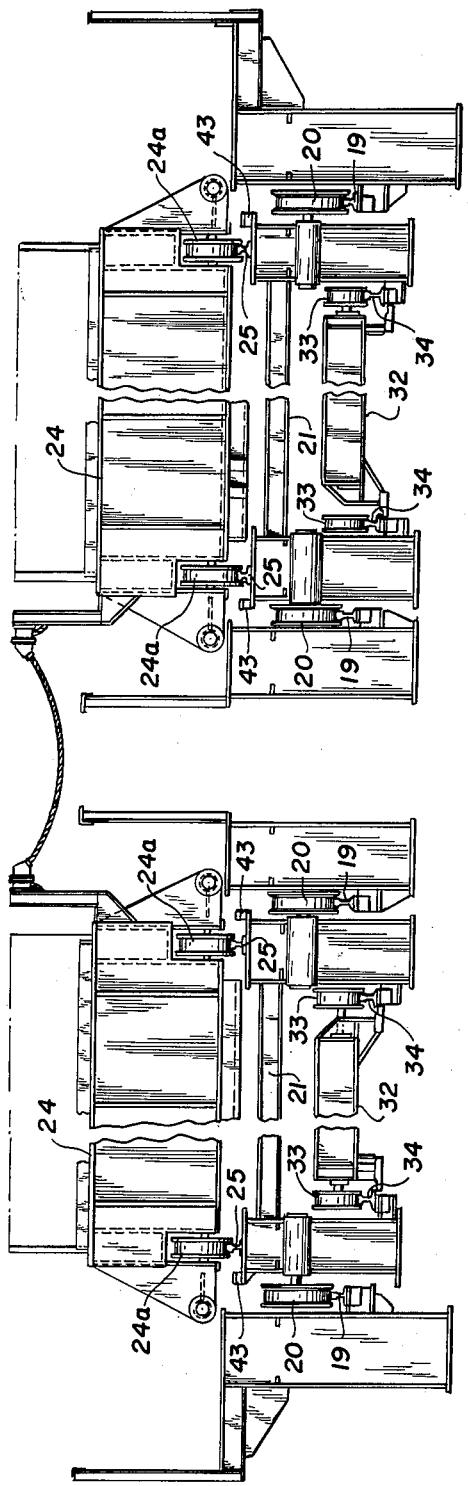
FIGURE 15 is a segmental section of two adjacent cranes showing the electrical interconnection for operation in unison.

Referring to the drawings, there is illustrated a ship 10 having a deck 11 beneath which are provided forward holds 12 and rearward holds 13. Above each of the forward hold 12 and rear hold 13, there is provided a pair of spaced apart rails 15, one on each side of the ship parallel to the center line.

A pair of container ship cranes according to this invention are mounted on each set of rails 15. Each of these cranes is provided with C-shaped end leg members 16, one leg 16a of each C carrying wheels 17 running on rails 15. Wheels 17 are driven by electric motors 17a in conventional manner. Each pair of cranes is arranged so that the openings in the C members face each other and couplings 16b are provided at each leg 16a whereby the pair can be coupled to form an operative unit. The other leg 16c of each C member is connected to main frame girders 18 and provided with bumpers 16d. Each of the main frame girders 18 is provided with rails 19 which carry wheels 20 on an extensible frame 21. The extensible frame 21 is moved along the rails 19 on the main frame by drive pinions 22 driven by motor 23 and gear drive 23a mounted on one end of the main frame. The drive pinions 22 engage racks 43 on the extensible frame 21.

A machinery trolley 24 is mounted on wheels 24a which travel on rails 25 on the extensible girder. The machinery trolley 24 carries a drive motor 26, drive gears 27 and drum 28 for the hoist cables (described later) as well as a drive motor 29, drive gears 30 and drum 31 for relatively traversing the hoist trolley 32 and the machinery trolley 24. The hoist trolley 32 is supported on the extensible girder on wheels 33 moving on rails 34 in the extensible girder. Hoist cables 35 are dead ended at one end of the machinery trolley 24 in spring loaded plungers 35a reciprocable in housings 35b fixed to trolley 24. They pass around fleeting sheaves 36 (more fully described later) at one end of the extensible girder, over sheaves 37 on the hoist trolley, through sheaves 39 on a lifting beam 40 and back over sheaves 38 on the lifting trolley, over fleeting sheaves 41 at the opposite end of the extensible girder and onto the hoist drum 28 on the machinery trolley. This arrangement permits the relative movement of the machinery trolley and the lifting or hoist trolley without changing the position of the lifting beam 40 with respect to the lifting trolley. The dead end arrangement on the cables makes it possible to lower the load without regard to the ship list so that the container goes into the hold parallel to the deck or off the dock parallel to the dock without regard to the ship list. This is accomplished by reason of the fact that spring loaded plungers 35a take up the slack of the cables which support the one side of the load on the lift beam which first touches the dock when the ship is listing.

The machinery trolley is moved along the extensible girder by means of drive pinions 42 driven by the same motor 29 and gears as drum 31 and on a common shaft 31a with drum 31 which engage the rack 43 alongside rails 25. A cable 44 fixed at its two ends to drum 31 passes over sheaves 45 and 46 at opposite ends of the extensible girder, through guide sheaves 32a and through a clamp 47 between the guide sheaves 32a on the hoist trolley. By moving the position of the machinery trolley, with respect to the hoist trolley with the clamp open, the relative position of the two trolleys on the extensible girder can be adjusted. The relative rate at which the two trolleys move is controlled by the ratio of the winch diameter 31 to the pinion diameter 42. Preferably this ratio is about 2:1. This is provided so that the machinery trolley can be properly positioned independently of the load trolley for changing loads or changing positions of the extensible girder and thereby act as a counterweight to the load on the extensible girder and the lift trolley when the lift trolley and girder are extended over the side of the ship. The clamp 47 is opened and closed by means of a drive crank 48 in the cab 49 of the hoist trolley acting through shaft 50, miter gears 51, shaft 52 and bevel gears 53. The rotation of bevel gears 53 also acts on shafts 54 and 55 extending transversely to rails 34. A pair of rail clamps 56 are provided at each rail and driven by shafts 54 and 55 so as to clamp rails 34 whenever clamp 47 is opened and release the rails when clamp 47 is locked. Movement of hoist trolley 32 is thus prevented while the machinery trolley position is being adjusted as for example if the ship is at a list or from friction of the moving cables.

The operation of the crane of this invention is as follows. The drive motors 17a are energized to drive the wheels 17 and thereby the main frame 18 to the desired position on the ship to load or unload containers. In the case of loading from the dock, the extensible girder is run out on wheels 20 over rail 19 by means of drive pinion 22 acting on rack 43 until positioned over the dock. The machinery trolley 24 is positioned relatively to load trolley 32 by releasing clamp 47 and moving the machinery trolley on its rails 25 by means of drive pinion 42 acting on rack 43 so that when the load trolley is at the end of the extensible girder over the dock, the machinery trolley will be at the opposite end of the extensible girder and act as a counterweight for the load or hoist trolley. The clamp 47 is tightened and the load trolley is moved from a position over the dock toward the ship and back by means of cable 44 and the machinery trolley 24. The lift beam 40 is lowered to engage the container to be stored, motor 26 is energized to drive drum 28 and cables 35 are taken up to raise the lift beam 40 to the hoist or load trolley. When the lift beam 40 reaches the load trolley the drive motor 29 is energized to drive shaft 31a and thereby pinions 42 and drum 31. This moves the machinery trolley and load trolley toward each other until the load trolley is over the desired hatch into one of the holds.

When it is desired to handle containers of extra-ordinary size the two adjacent cranes are brought together with the C openings facing each other. In this position the bumpers 16d will be in engagement and couplings 16b are engaged and fastened so that the two units move together. The motor controls for both units are connected together in conventional interlocking arrangement through a removable interconnecting cable 60 having male elements entering female sockets 61 on the two machinery trolleys so that one operator can control all movement and the units are operated as a single unit in precisely the manner described above.

Figure 17:
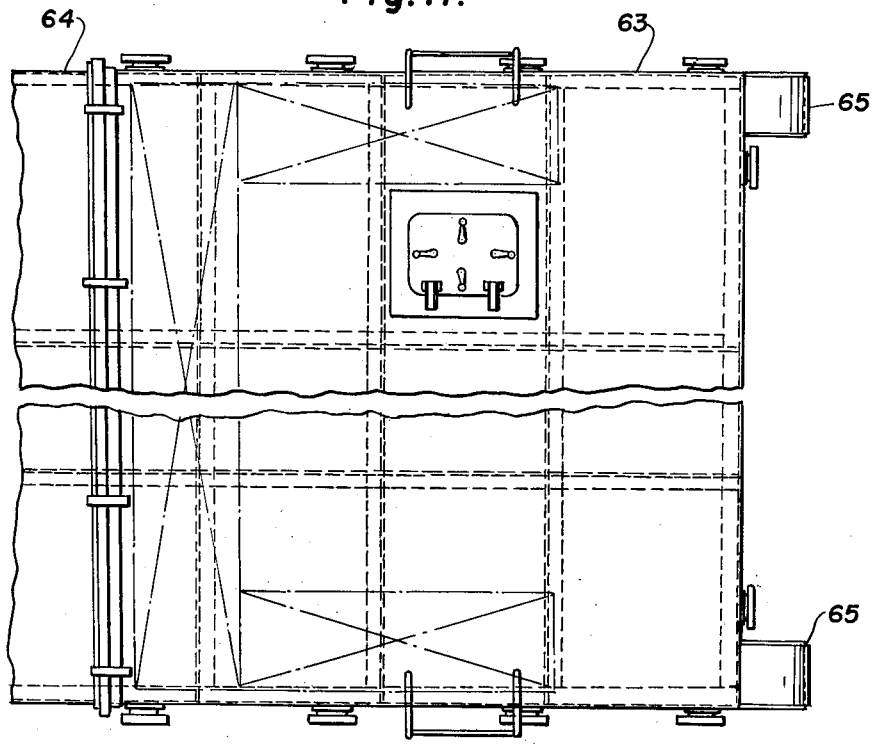
FIGURE 17 is a top plan view of the cover for the machinery trolley.
Figure 18:
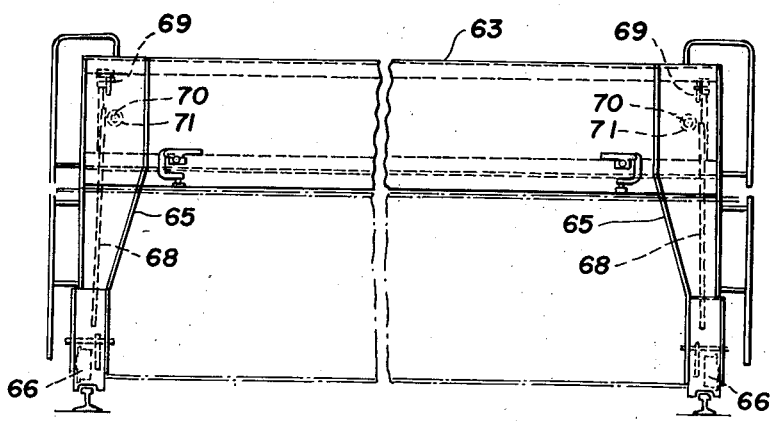
FIGURE 18 is an end elevation of the cover of FIGURE 17.
Figure 19:
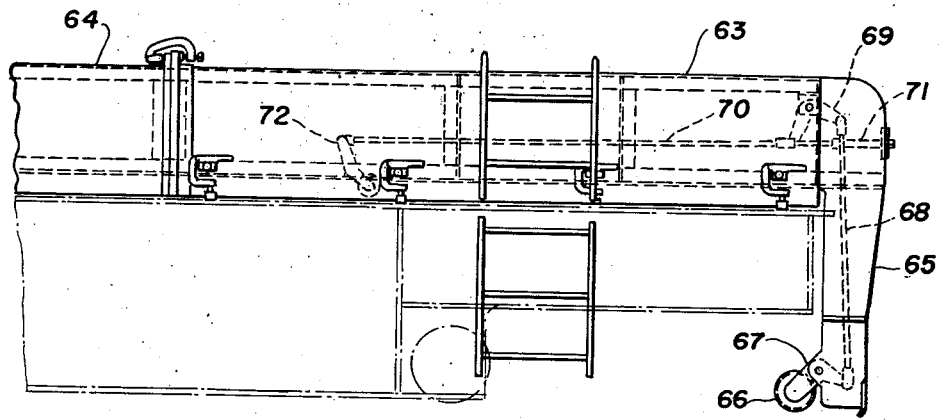
FIGURE 19 is a side elevation of the cover of FIGURE 17.

In FIGURES 17, 18 and 19 we have illustrated a cover, preferably of aluminum, for the machinery trolley 24. The cover is made up of two segments 63 and 64. Each segment is provided with two leg members 65, one at each outside corner. Each leg member is provided with a wheel 66 mounted on one arm of a bell crank 67 pivoted on the leg member. The opposite arm of the bell crank 67 is connected to a lever arm 68 which is in turn connected to one arm of a bell crank 69 pivoted on the sidewall of the cover. The opposite arm of bell crank 69 is pivotally attached to lever 70 which is moved horizontally by a screw 71. A bell crank 72 at the opposite end of lever 70 carries a wheel 73. The wheel 73 is designed to bear on the frame of the machinery trolley. The wheel 66 is designed to operate on rails 25 and with wheel 73 to carry the segment of cover on which it is mounted.

Figure 16:
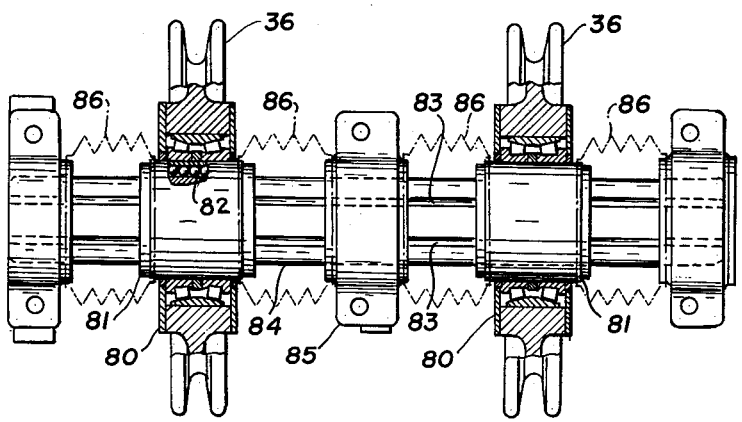
FIGURE 16 is a segmental section through the lifting sheaves showing the fleeting arrangement.

The fleeting sheaves 36 are illustrated in FIGURE 16. Sheaves 41 are identical and the same illustration applies to them. The sheaves 36 are rotatable on bearings 80 carried on bearing blocks 81. Bearing blocks 81 contain recirculating balls 82 which operate in splines 83 on shaft 84. This permits the blocks to move easily between the shaft clamps 85. Accordion resilient sheaths 86 cover the section of shaft between the blocks and clamps 85.

While certain preferred embodiments of this invention have been illustrated and described herein, it will be understood that this invention may be otherwise embodied within the scope of the following claims.

We claim:

1. In a container ship having spaced apart rails adjacent each edge of the deck parallel to the center line, a crane structure adapted to move on said rails comprising a main frame extending transversely of the ship, leg means on the ends of said frame holding the frame vertically above the ship deck, drive means carrying the leg means on the rails on the deck, an extensible girder means mounted for movement on the main frame transverse to the center line of the ship from one extreme position where the extensible girder extends over one side of the ship to an opposite extreme position where the opposite end extends over the opposite side of the ship, a load trolley movable on said extensible girder from one end to the other, a machinery trolley movable on the extensible girder, connections between the machinery trolley and the load trolley whereby the two trolleys may be selectively positioned in any one of a plurality of positions with respect to one another to set up a given operative relationship between the machinery trolley and the load trolley and thereafter the load trolley and machinery trolley are moved in unison so that the machinery trolley counterbalances the load trolley, and drive means moving the extensible girder, the load trolley and the machinery trolley in cooperative relationship.

2. In a container ship crane structure as claimed in claim 1 wherein the leg means are in the form of C-members.

3. In a container ship as claimed in claim 1 wherein each pair of rails carries a pair of crane structures in which the leg means are in the form of C-members, open toward each other and provided with connecting means to connect the C-members together to form a unitary operative structure.

4. In a container ship having spaced apart rails adjacent each edge and parallel to the center line, a crane structure adapted to move on said rails comprising a main frame extending transversely of the ship, leg means on the end of said frame holding the frame vertically above the ship deck, drive means carrying the leg means on the track, an extensible girder means mounted for movement on the main frame transverse to the center line of the ship from one extreme position where the extensible girder extends over one side of the ship to an opposite extreme position where the opposite end extends over the opposite side of the ship, drive means on the main frame moving said extensible girder with respect to the main frame, a load trolley movable on said extensible girder from one end to the other, a machinery trolley movable on the extensible girder, connections between the machinery trolley and the load trolley whereby the two trolleys may be selectively positioned in any one of a plurality of positions with respect to one another to set up a given operative relationship between the machinery trolley and load trolley and thereafter the machinery trolley and load trolley are moved in unison so that the machinery trolley counterbalances the load trolley and drive means moving the load trolley and the machinery trolley in cooperative relationship.

5. In a container ship having spaced apart rails adjacent each edge and parallel to the center line, a crane structure adapted to move on said rails comprising a main frame extending transversely of the ship, leg means on the end of said frame holding the frame vertically above the ship deck, drive means carrying the leg means on the track, an extensible girder means mounted for movement on the main frame transverse to the center line of the ship from one extreme position where the extensible girder extends over one side of the ship to an opposite extreme position where the opposite end extends over the opposite side of the ship, drive means on the main frame engaging a rack on the extensible girder to move said extensible girder with respect to the main frame, a load trolley movable on said extensible girder from one end to the other, a machinery trolley movable on the extensible girder, drive means on the machinery trolley engaging the said rack on the extensible girder whereby to position the machinery trolley with respect to the extensible girder, connections between the machinery trolley and the load trolley whereby the two trolleys may be selectively positioned in any one of a plurality of positions with respect to one another to set up a given operative relationship between the machinery trolley and the load trolley and thereafter the machinery trolley and load trolley are moved in unison so that the machinery trolley counterbalances the load trolley and drive means on the machinery trolley moving the load trolley with respect to the machinery trolley.

6. In a container ship having spaced apart rails adjacent each edge and parallel to the center line, a crane structure adapted to move on said rails comprising a main frame extending transversely of the ship, leg means on the end of said frame holding the frame vertically above the ship deck, drive means carrying the leg means on the track, an extensible girder means mounted for movement on the main frame transverse to the center line of the ship from one extreme position where the extensible girder extends over one side of the ship to an opposite extreme position where the opposite end extends over the opposite side of the ship, a load trolley movable on said extensible girder from one end to the other, a machinery trolley movable on the extensible girder, a cable connection between the machinery trolley and the load trolley whereby the two trolleys may be selectively positioned with respect to one another, clamp means on the load trolley operable to selectively clamp and release said cable and simultaneously release and clamp the load trolley to the extensible girder whereby the machinery trolley counterbalances the load trolley, and drive means moving the machinery trolley with respect to the extensible girder.

7. In a container ship having spaced apart rails adjacent each edge and parallel to the center line, a crane structure adapted to move on said rails comprising a main frame extending transversely of the ship, leg means on the end of said frame holding the frame vertically above the ship deck, drive means carrying the leg means on the track, an extensible girder means mounted for movement on the main frame transverse to the center line of the ship from one extreme position where the extensible girder extends over one side of the ship to an opposite extreme position where the opposite end extends over the opposite side of the ship, a load trolley movable on said extensible girder from one end to the other, a lift frame suspended from said load trolley, a machinery trolley movable on the extensible girder, lift cables carrying said lift frame, drum means on the machinery trolley carrying one end of said cables whereby the lift frame may be raised and lowered, spring loaded members holding the opposite ends of said cables, connections between the machinery trolley and the load trolley whereby the two trolleys may be selectively positioned in any one of a plurality of positions with respect to one another to set up a given operative relationship between the machinery trolley and load trolley and thereafter the machinery trolley and load trolley are moved in unison so that the machinery trolley counterbalance the load trolley and drive means moving the load trolley and the machinery trolley in cooperative relationship.

8. A container ship crane as claimed in claim 7 wherein the lift frame is rectangular in form and provided with a sheave at each corner, and the lift cables correspond to the number of sheaves on the lift frame, each of said cables passing from a spring loaded member on the machinery trolley over a sheave on one end of the extensible girder, over a sheave on the machinery trolley, through a sheave on one corner of the lift frame, over a sheave on the machinery trolley, through a sheave on the opposite end of the extensible girder to the drum on the machinery trolley.

9. In a container ship having spaced apart rails adjacent each edge and parallel to the center line, a crane structure adapted to move on said rails comprising a main frame extending transversely of the ship, leg means on the end of said frame holding the frame vertically above the ship deck, drive means carrying the leg means on the track, an extensible girder means mounted for movement on the main frame transverse to the center line of the ship from one extreme position where the extensible girder extends over one side of the ship to an opposite extreme position where the opposite end extends over the opposite side of the ship, a load trolley movable on said extensible girder from one end to the other, a lift frame suspended from said load trolley, a machinery trolley movable on the extensible girder, lift cables carrying said lift frame, drum means on the machinery trolley carrying one end of said cables whereby the lift frame may be raised and lowered, spring loaded dead end members holding the opposite end of said cables, a cable connection between the machinery trolley and the load trolley whereby the two trolleys may be selectively positioned with respect to one another, clamp means on the load trolley operable to selectively clamp and release said cable and simultaneously release and clamp load trolley to the extensible girder whereby the machinery trolley counterbalances the load trolley and drive means moving the machinery trolley in cooperative relationship.

10. A container ship crane as claimed in claim 9 wherein the lift frame is rectangular in form and provided with a sheave at each corner, and the lift cables correspond to the number of sheaves on the lift frame, each of said cables passing from a spring loaded member on the machinery trolley over a sheave on one end of the extensible girder, over a sheave on the machinery trolley, through a sheave on one corner of the lift frame, over a sheave on the machinery trolley, through a sheave on the opposite end of the extensible girder to the drum on the machinery trolley.

References Cited in the file of this patent

UNITED STATES PATENTS

| 1,395,077 | Aveling | Oct. 25, 1921 |
| 2,360,470 | Brown | Oct. 17, 1944 |
| 2,555,297 | Smith et al. | May 29, 1951 |